United States Patent
Angelow

(10) Patent No.: US 8,004,993 B2
(45) Date of Patent: Aug. 23, 2011

(54) MULTIROUTER FOR TIME-CONTROLLED COMMUNICATION SYSTEM

(75) Inventor: Harald Angelow, Vienna (AT)

(73) Assignee: TTTech Computertechnik Aktiengesellschaft, Vienna (AT)

( * ) Notice: Subject to any disclaimer, the term of this patent is extended or adjusted under 35 U.S.C. 154(b) by 139 days.

(21) Appl. No.: 12/507,886

(22) Filed: Jul. 23, 2009

(65) Prior Publication Data

US 2010/0020828 A1 Jan. 28, 2010

(30) Foreign Application Priority Data

Jul. 25, 2008 (AT) ................................ A 1160/2008

(51) Int. Cl.
*G01R 31/08* (2006.01)
(52) U.S. Cl. ........................................ 370/240; 370/498
(58) Field of Classification Search .................. 370/240, 370/498, 503, 508–510
See application file for complete search history.

(56) References Cited

U.S. PATENT DOCUMENTS

| | | | |
|---|---|---|---|
| 5,694,542 | A | 12/1997 | Kopetz |
| 6,529,529 | B1 * | 3/2003 | Tohkairin ...................... 370/535 |
| 2003/0154427 | A1 | 8/2003 | Hermann et al. |
| 2008/0247372 | A1 * | 10/2008 | Chion et al. .................... 370/338 |
| 2009/0116420 | A1 * | 5/2009 | Jeong et al. .................... 370/312 |
| 2010/0008383 | A1 * | 1/2010 | Koga et al. .................... 370/503 |

FOREIGN PATENT DOCUMENTS

| | | |
|---|---|---|
| DE | 10 2006 058 309 A1 | 6/2008 |
| DE | 10 2007 003 126 A1 | 6/2008 |
| EP | 2 053 830 A2 | 4/2009 |
| WO | WO 94/06080 | 3/1994 |
| WO | WO 01/13230 A1 | 2/2001 |
| WO | WO 2008/029320 A2 | 3/2008 |
| WO | WO 2008/071506 A1 | 6/2008 |
| WO | WO 2008/077717 A1 | 7/2008 |

OTHER PUBLICATIONS

Kopetz et al., "The Time-Triggered Ethernet (TTE) Design," Eighth IEEE Symposium on Object-Oriented Real-Time Distributed Computing (ISORC 2005).
European Search Report for Application No. EP 09 45 0128 dated Nov. 5, 2009.

(Continued)

Primary Examiner — Ricky Ngo
Assistant Examiner — Phuongchau B Nguyen
(74) Attorney, Agent, or Firm — RatnerPrestia

(57) ABSTRACT

To relay messages in a time-controlled communication system with a star coupler arranged as a multirouter, messages arriving via ports are relayed according to a rule defined in the star coupler. Relaying paths are switched according to a rule defined in the star router which describes relaying paths for messages, namely in the synchronized operating state depending on the time according to the global time basis of the communication system. Two relaying paths can occur simultaneously in at least one time slot whereby they are in disjunction to one another. Each port belongs to only one relaying path respectively at any time. A check is conducted on the basis of a message's content as to whether the relaying of the message complies with an acceptance rule. Relaying of the message to those target ports which do not match the rule is cancelled or ended under the invalidation of the message.

13 Claims, 1 Drawing Sheet

OTHER PUBLICATIONS

Milbredt et al., "An Investigation of the Clique Problem in FlexRay," International Symposium on Industrial Embedded Systems, Jun. 11-13, 2008, pp. 200-207.

Milbredt et al., "Automated Testing of FlexRay Clusters for System Inconsistencies in Automotive Networks," 4th IEEE International Symposium on Electronic Design, Test and Applications, Jan. 23-25, 2008, pp. 533-538.

Paulitsch et al., "Starting and Resolving a Partitioned BRAIN," 11th IEEE International Symposium on Object Oriented Real-Time Distributed Computing (ISORC), May 5-7, 2008, pp. 415-421.

Kopetz, "A Comparison of TTP/C and FlexRay," May 9, 2001. Internet Citation, www.informatik.uni-ulm.de/rs/projekte/core/rtsl/tech.docs2/TTP-flexray-kopetz.pd.

\* cited by examiner

MULTIROUTER FOR TIME-CONTROLLED COMMUNICATION SYSTEM

FIELD OF THE INVENTION

The invention relates to a process for relaying messages within a time-controlled communications system, consisting of numerous communication nodes, whereby each node is connected to a port on at least one star coupler via a data line, said port being unambiguously assigned to that node, whereby the star coupler relays messages from each port (referred to as the source port) to one or several other ports (referred to as target ports) along configurable relaying paths; here, the star coupler effects a switching of the relaying paths in accordance with a rule defined in the star coupler which describes the relaying paths for messages. This switching of the relaying paths occurs at least within the synchronized operating state of the star coupler. The relaying paths are thereby switched depending on the time, in accordance with a global time basis for the time-controlled communication system, and at least one time (to be precise, in at least one of the slots), the rule prescribes at least two relaying paths simultaneously; relaying paths occurring simultaneously are in disjunction to another: in other words, at any time, each port is at most part of only one relaying path respectively.

The invention further relates to a star coupler for carrying out this process.

BACKGROUND

A process and a star coupler are described in WO 2008/029320 A2.

An example of the type of time-controlled communication systems examined here are especially those systems based on the FlexRay standard. These systems are distributed computer systems with time-controlled transmission protocols and a global time basis, which have become known above all in connection with error-tolerant real time applications. For this, also see the applicant's WO 94/06080 A1 (issued as U.S. Pat. No. 5,694,542 in the United States) and WO 01/13230 A1 (published as US 2003/0154427 A1 in the United States).

Experts are also familiar with time-controlled transmission protocols/communication systems for the transmission of messages between the network nodes of a distributed computer system. The protocols and/or communication systems examined here, such as FlexRay for example, are based on a so-called Time Division Multiple Access, or TDMA process for short. TDMA is a time multiplexing process where each mode is assigned a fixed number of TDMA slots per "TDMA circulation".

With time multiplexing, data transmission occurs between the network nodes in a defined multiplex framework where there a fixed time slot ("slot") is available for each transmission channel. The individual time slots are processed in sequence. If one time unit has elapsed, the transmission for the active channel is immediately discontinued; the transmission bandwidth is then available for the next user.

The term TDMA slot (hereafter called "slot" for short) describes a time interval with beginning and end which is defined on a time basis recognized system-wide. This time basis, which is recognized by all network nodes throughout the distributed computer system, is described in the flowing as a global time basis or also as a "global timer". Each slot is recognized in equal manner by all network nodes. The individual slots are in disjunction to one another and thus do not overlap. In a TDMA system slot, there can be a maximum of one network node performing one transmission. The slots can be aligned with the requirements of each network node. If these requirements are known, one can use TDMA to achieve high bus loads without indeterminism. As with other schemata designed to avoid conflicts, all stations must be fully time-synchronized with TDMA.

The previously mentioned WO 2008/029320 A2 describes an expansion of this TDMA system in terms of a distributive style of functionality which allows for parallel relaying of messages which could stem from different senders.

SUMMARY OF THE INVENTION

The applicant noticed that the situation often arises where messages from a certain sender is only processed by a small number of receivers. Alongside a distributive style of functionality which allows parallel relaying of messages which can stem from different senders, the occurrence of messages is furthermore to be decreased.

Taking as its basis a process of the kind initially described, according to the present invention the task set is solved through the use of an invalidation process where, during the relaying of a message at the latest, a check is conducted on the basis of a message's content as to whether the relaying of the message is in accordance with a rule of acceptance and where, depending on the outcome of this check, the relaying of the message to those target ports (these are the ports to which the message is relayed) which do not match the rule is cancelled or ended under the invalidation of the message (possibly also beforehand).

During the system start-up stage especially, such an invalidation can be advantageous, namely for messages which are not start-up and/or synchronization messages. Accordingly, this check on the basis of the message's content in a non-synchronized operating state can be executed during the already initiated relaying of the message.

In the non-synchronized operating state, it can thus be prescribed that only those messages which are start-up or synchronization messages are relayed unimpaired—that is, without cancellation of the relaying and without invalidation.

In synchronized operation, the time in accordance with the global time basis is necessary and sufficient to define the relaying paths to be switched. As already known, the synchronized operation of the star coupler is achieved as soon as the private clock of the star coupler synchronizes itself with the private clocks of the other network participants within a constant interval, also known as precision.

It must be emphasized at this point that the rule of there being two or more simultaneous relaying paths need not apply for each slot. Furthermore, this can be installed for one, several or all slots, depending on the requirements of the configured application. Then only one relaying path (where relaying occurs from one source port to one, several or all target ports) or no relaying path at all can be installed for the remaining slots.

In the non-synchronized operating state (asynchronized operation), on the other hand, it is beneficial in a further development of the invention if there is a relaying path independent of time and if a decision is made on the basis of the message content and/or the port allocation as to whether or not a message is relayed or cancelled.

An exemplary embodiment of the present invention allows for a limited opening in the strict TDMA principle, and through this the parallel relaying of messages, which arrive at the star coupler overlapping in time. The star coupler relays such messages in parallel to the target nodes ("multirouting")

by activating several disjuncted relaying paths. This parallel operation of the data streams results in a marked increase in the available bandwidth.

A further advantage of the invention is that configuration alterations are necessary only to such end devices as are also functionally affected by the introduction of a multirouter or the data streams occurring in parallel made possible as a result. Here, however, the changes can also be limited to configuration adaptations which are simple to program, so that the end devices can continue to function after the standard protocol (especially FlexRay). This property is also known as "Drop-in": a multirouter according to the present invention can be transparently integrated into an existing network, especially a FlexRay network, without this necessitating changes to the configurations of the nodes existent in the network.

In another embodiment, the switching occurs exclusively dependent on the time, at least in the synchronized operating state, without the use of additional information such as, for example, additional control signals.

To achieve a rapid relaying of at least a portion of the messages, the relaying can occur according to a cut-through process. Here, the relaying of a message is initiated even before the reception of the message is completed, especially without the creation of a save-buffer for the messages.

The process according to the invention is especially suited to the realization of a communication system in which a time-controlled communication protocol is used which is based on a FlexRay standard.

In the time-controlled communication system, it is beneficial that several star couplers can be used which are connected to one another directly or indirectly via one or several data lines and form a closed network.

For the efficient handling of messages which serve the synchronization of the system and the multirouter itself, it is advantageous if a rule which is independent of the time is used for the relaying in a non-synchronized operating state. Thus when selecting the target ports on the basis of a message's source port, it is merely the identification of the port which is used. In this asynchronic operation, it is the port (the port identification) which is accordingly necessary and sufficient to define the relaying paths.

Equally, the invention is solved by a star coupler which is installed (as a "multirouter") to carry out the aforementioned process according to the invention. The advantages and further developments of the star coupler correspond to those of the process according to the invention.

BRIEF DESCRIPTION OF THE DRAWINGS

In the following, the invention is exemplified in a non-limiting embodiment example which is depicted in the appended diagrams. The diagrams show:

FIG. 4A shows a routing table corresponding to the routing depicted in FIG. 3;

FIG. 4B a routing table for another slot; and

FIG. 5 shows a routing table for the non-synchronized operation of the multirouter.

DETAILED DESCRIPTION OF THE INVENTION

Figure 1:
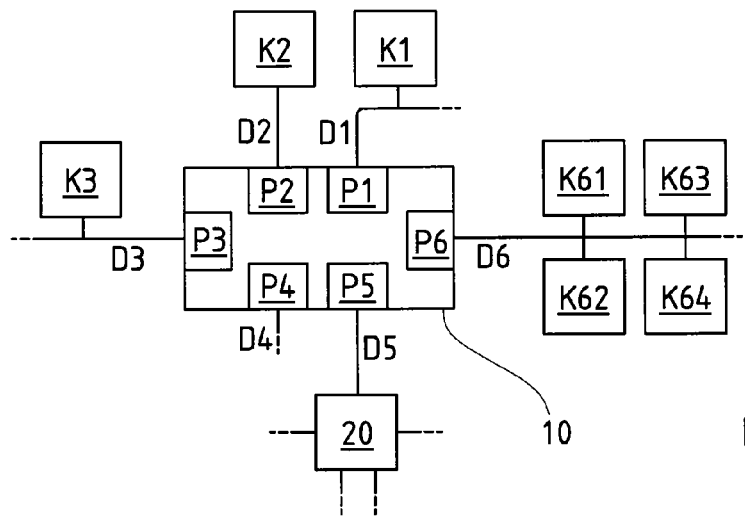
FIG. 1 a FlexRay network with a multirouter according to the invention.

In accordance with FIG. 1, a star coupler embodied as a Multirouter 10 according to an exemplary embodiment of the invention displays a number of ports; In FIG. 1 for example, six ports P1 . . . P6 are shown. Each port P1 . . . P6 can be connected via a respective data line D1 . . . D6 to a sub-network, which is respectively made up of at least one node computer Kn. In FIG. 1, node computers K1, K2, K3 and K61, K62, K63, K64 are shown as examples. As shown in the example of the node K61 . . . K64, several nodes are often connected to a sub-network via one data line. The data line D6 serves as a bus for these nodes. Other sub-network configurations are also possible, of course; especially the number of nodes in a sub-network can vary depending on the manner of use. The number of ports is always optional and any value from 2 upwards can be selected, although from 4 upwards is practical. Also, as many ports as there are nodes in the system can be implemented.

The communication within each sub-network, specifically via each of the datalines D1 . . . D6, occurs according to the FlexRay standard. This means that conventional FlexRay nodes can be attached to each data line without their needing modification for the implementation of the invention. The sub-networks are connected with each other via the Multirouter 10 exclusively. The FlexRay standard also governs the Multirouter 10's reception and sending of messages via each of ports P1 . . . P6 in each individual case.

The node computers K1 . . . K64 can, for example, also be realized in accordance with the description in WO 01/13230.

Figure 2:
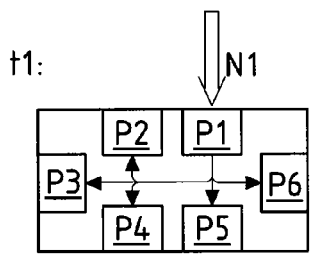
FIG. 2 illustrates the operating mode of a 'Bus Guardian' of the FlexRay according to the current state of technology.

FIG. 2 illustrates a processing method conforming to the FlexRay standard of a message arriving at a star coupler in the manner of a recognized, so-called 'Bus Guardian'. The FlexRay standard is based on the broadcasting principle and accordingly demands that only one node is respectively active as a sender in the network at any given time; thus like the node K1 in the example given. The sender order—when a node is permitted to send—is designated in advance. In the current example, the slot (time slot) t1 is for example reserved for the node K1. A message N1 is depicted, which for slot t1 arrives in port 2 for example. This message N1 is relayed in a manner whereby it is copied on to all other ports P2 . . . P6. (It is possible to allow free ports—those which do not have a node computer attached to them—to be passed over.) The message is thus relayed to all other network nodes. In contrast, messages which arrive via ports other than P1 during t1 are rejected.

Further to the FlexRay standard, the invention makes it possible for several sending nodes to be permitted within one slot if these sending nodes are each distributed on a different port.

Figure 3:
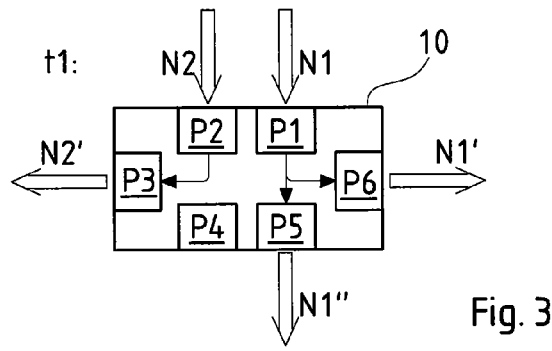
FIG. 3 exemplarily visualizes the routing in the multirouter in FIG. 1.

FIG. 3 illustrates an example of simultaneously sending nodes according to the invention. It is permitted for the slot t1 that messages can be received via two ports P1, P2 of the Multirouter 10. A message N1 arriving at port P1 is for example relayed via ports P5 and P6 in the form of the outgoing messages N1' and N1" and made accessible in this way to all nodes connected there, while a message N2 arriving at port P2 is relayed to port P3 (outgoing message N2'). Here it is also possible that other ports, such as port P4 in the example, do not receive any messages in the slot t1 being examined.

The information regarding the way in which messages are to be relayed for each slot is designated beforehand, for example in the form of structural routing information, namely as a configuration in the form of routing tables in the multirouter which remain unaltered during network operation. FIG. 4A shows a routing table 41, corresponding to the data described in FIG. 3. Each of the lines 1 to 6 corresponds to a number matching a sending port (line n for source port Pn), where each column has entered in it to which ports a message is to be relayed (column n' to source port Pn). For example, line 1 means that in slot t1 a message arriving via port P1 is copied onto ports P5 and P6. Each line containing a fixed entry (symbolized by an X) thus corresponds to a relaying path in the terms of the invention. Empty lines, such as lines 3 to 6 in the example, indicate a port for which no messages are intended via the slot in question.

Of course other allocations are possible for other slots. FIG. 4B depicts the example of a routing table 42 for a second slot t2. For this slot, a node connected via port P3 and P4 respectively is permitted to function as a sending node, whereby a message is relayed from P3 to port P1, but, in contrast, a message from P4 is relayed from P4 to P2 and P6.

Of course only one message may be sent on one port at any given time. This is in accordance with the requirement that no more than one entry can be active in each column of the routing tables 41 and 42. In other words, the lines in each table cannot have any overlapping (active) entries—they are disjunctive. This in no way rules out their being multiple slots with an active entry in the same column; as a rule, a different sending port is being described in each instance then, as clarified in FIG. 4A and 4B through the example of column 6 (for port P6).

In the embodiment given as an example, the allocation of the routing tables 41 and 42 in synchronized operation is based exclusively on the global time of the communication system (FlexRay system). A different route configuration can be active in each slot of a TDMA cycle. When a complete transmission cycle has been gone through, the sequence of the slots and the associated relaying of message begins anew. A complete transmission cycle for example can be a TDMA cycle (complete run-through of all slots). A transmission cycle can also be a multiple of a TDMA cycle, especially a FlexRay cycle, which then allows the definition of different configurations for each slot in the FlexRay cycle up to 64 TDMA cycles).

Through the parallel relaying of messages, the Multirouter 10 enables a definitely improved, efficient utilization of the bandwidth in time-controlled communication systems. This also results in an increase in the effective bandwidth.

In addition, this results in the advantageous effect that malfunctioning nodes which would disrupt the communication (for example by sending messages at wrong points in time) can be fixed in an efficient manner. This rules out the collision of messages, through which the invention realizes the material function of a central Bus Guardian. Further functions of a Bus Guardian, such as signal reshaping and stringent checks regarding the timing characteristics of the incoming signal, can also be realized in a star coupler according to the invention. However, these features are not of further significance for the present invention and are not further described here.

It is here noted that, in contrast to known switches such as the Ethernet switch, for example, the routing is statical: the information regarding which messages in a certain slot are distributed among which ports (that is to say, the configuration of the routing) is structural, namely pre-configured, and cannot be dynamically changed. The advantage of a static configuration consists in the chronological determinism of the communication system thus achieved, and the quicker and more precise identification of errors thus made possible.

It is also here noted that according to the invention, several star couplers can be provided in a network as well. Referring again to FIG. 1, a second Multirouter 20 can be thus connected to a Multirouter 10 via a data line, such as the data line D5 for example. Further multirouters (not shown) can also be added, which overall forms a closed network. A further variant is also possible, a network structure analogue to FIG. 1 of WO 01/13230 A1, whereby exactly one node is connected to each port of a multirouter and/or the multirouters are additionally replicated so that each node is respectively connected to a multirouter port.

The messages processed in the Multirouter 10 are processed according to a cut-through process. This means that the multirouter's data is relayed largely unbuffered: When a message arriving at a port (e.g. N1 in FIG. 3) is relayed, the sending of the message (as messages N1', N1" in FIG. 3) thus begins only a few bit cycles later compared to the incoming original message, yet certainly long before the reception of the message is completed. The minor delay of a few bit cycles represents the time necessary for the preferably transient processing of the message for relaying in the multirouter. This is a material property of the multirouter, which guarantees the mutual synchronicity of the individual sub-networks with one another.

The invention avoids the problem known as "masquerading", in TDMA systems where messages which do not correspond to the fixed allocation between slot and sender are understood by a receiver in an incorrect manner, as the messages are attributed to a different (supposedly correct) sender. This can lead to the faulty processing of message content, especially in asynchronic operation during system start-up. An initial starting-point for avoiding masquerading would be to include a sender identifier in the message by which the receiver can conduct a sender identity check. This would of course be in connection with a reduction in the effective bandwidth and exclude the use as a "drop-in" as described above. By contrast, the invention on the one hand proposes to limit the relaying of messages to the actually intended receiver sub-networks, as further described above using FIG. 3. On the other hand, non-conforming messages can further be invalidated before completion of relaying, as described in the following.

During the validity check, a content check of the message, for example the message header, is carried out in the Multirouter 10 even before the message is relayed. If it is ascertained that the message is inadmissible, the message is invalidated. This occurs through the transmission of the message being cancelled and/or being continued only insofar as this is necessary in order not to impair the communication within the network. For example, remaining time slots can be prematurely ended and the message closed with a trailer. The functionality of the invalidation can be especially significant for the implementation of the expansions to the synchronization transparency and the selective wake-up discussed hereafter.

The multirouter discussed here can be advantageously designed for retrospective integration, namely coming into operation when the connected sub-networks are already operational. This is assuming an initial state in which communication is already occurring and synchronized within the individual sub-networks. In order to achieve a rapid synchronization not only of the multirouter but also of other, not yet synchronized sub-networks, a synchronization transparency as described in the following is appropriate. The multirouter uses synchronization messages in familiar fashion in order to determine the time basis of the TDMA system and to synchronize itself with this. As long as this process is not yet successfully completed and the multirouter is thus unsynchronized, the multirouter blocks/invalidates all messages with exception of so-called start-up messages (start-up frames) and synchronization messages (sync frames). In conformity with the FlexRay standard, these messages are relayed via all ports to all node computers. All other messages are invalidated or, as far as this is can be done in time, simply blocked.

Start-up and synchronization messages are marked in familiar fashion by having specific bits ('sync frame indicator' bit/'start-up frame indicator' bit) placed in the message header. These bits belong to the first bits of a header and are thus recognized early during the message check. Message invalidation occurs because the remaining frame content following these first bits is emptied; this for example occurs because the data line is set to 'idle' (no transmission) immediately following the processing of these bits and the positive decision to invalidate. In this way, it is clear to each receiving node that the thus marked message contains invalid data and is to be rejected.

As soon as synchronization has occurred, the multirouter switches over to the multirouting operation mode described above. This method of procedure allows the sub-networks to come into synchronization at an accelerated rate even if the multirouting according to the present invention cannot yet take place and a complete relaying of the entire accruing message volume is inadmissible as it would lead to communication errors.

In the multirouter's unsynchronized state, limited relaying of messages can be provided for, namely only from those sub-networks which exhibit nodes capable of start-up to all other networks. FIG. 5 shows an example of a routing table 40 for the asynchronic state (as), when start-up nodes are connected via ports P2 and P3 for example. Start-up and synchronization messages from these ports are relayed to all other ports irrespective of their slots; independently of this, other messages (also including such via P2 and P3) are not relayed. Messages of this type are recognized by the bits placed in their headers, as is familiar from the FlexRay standard described above.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

The invention claimed is:

1. A method for relaying messages within a time-controlled communications system, comprising a plurality of communication nodes and at least one star coupler having a number of ports, said ports being uniquely assigned to respective communication nodes, each of which is connected to the port assigned thereto via a data line,
   wherein the star coupler relays messages, with each message being relayed from a respective port to one or several other ports along configurable paths, and the star coupler, at least during a synchronized operating mode, effects a switching of the relaying paths in accordance with a rule defined in the star coupler and describing the relaying paths for messages,
   wherein in the synchronized operating mode the relaying paths are switched depending on the time in accordance with a global time basis for the time-controlled communication system, and at at least one time at least two relaying paths occur simultaneously in the star coupler, wherein relaying paths occur simultaneously are in disjunction to another, such that at any time each port belongs to only one respective relaying path,
   said method comprising the following steps conducted at the star coupler:
   conducting a check during the relaying of a message at the latest based on the content of a message as to whether the relaying of the message to at least one target port is in accordance with a rule of acceptance, and
   either:
      i) cancelling the relaying of the message to target ports which do not match said rule of acceptance based on the outcome of said check; or
      ii) ending the relaying of the message to the target ports which do not match said rule of acceptance based on the outcome of said check by invalidating the message.

2. The method according to claim 1, wherein at least some of the messages are relayed according to a cut-through process, during which the relaying of a message is begun even before its reception is completed.

3. The method according to claim 2, wherein a time-controlled communication protocol is used which is based on a FlexRay standard.

4. The method according to claim 2, wherein the relaying paths in the synchronized operating state are switched exclusively dependent on the time according to the global time basis.

5. The method according to claim 1, wherein a time-controlled communication protocol is used which is based on a FlexRay standard.

6. The method according to claim 5, wherein the relaying paths in the synchronized operating state are switched exclusively dependent on the time according to the global time basis.

7. The method according to claim 1, wherein the relaying paths in the synchronized operating state are switched exclusively dependent on the time according to the global time basis.

8. The method according to claim 1, wherein the rule is realized in the form of structural routing information, especially as configuration data.

9. The method according to claim 1, wherein a plurality of star couplers are used within a time-controlled communication system, and wherein the plurality of star couplers are either directly or indirectly connected with one another via one or several data lines and form a closed network.

10. The method according to claim 1, wherein a non-time-dependent rule is used to relay messages in a non-synchronized operating state.

11. The method according to claim 10, wherein in the non-synchronized operating state, a relaying path exists independently of time, and a decision as to whether a message is relayed or cancelled is decided on the basis of at least one of the message content and the port allocation.

12. The method according to claim 1, wherein the check on the basis of the message content in a non-synchronized state occurs during the already initiated relaying of a message.

13. The method according to claim 12, wherein in the non-synchronized operating state, only those messages which are either start-up or synchronization messages are relayed without relaying cancellation or invalidation.

* * * * *

UNITED STATES PATENT AND TRADEMARK OFFICE
CERTIFICATE OF CORRECTION

| | | |
|---|---|---|
| PATENT NO. | : 8,004,993 B2 | Page 1 of 1 |
| APPLICATION NO. | : 12/507886 | |
| DATED | : August 23, 2011 | |
| INVENTOR(S) | : Angelow et al. | |

It is certified that error appears in the above-identified patent and that said Letters Patent is hereby corrected as shown below:

Title page, Item (75) Inventor is corrected to read:
-- Harald Angelow, Vienna (AT);
Steiner Wilfried, Wien (AT); --.

Signed and Sealed this
Eighteenth Day of August, 2015

Michelle K. Lee
*Director of the United States Patent and Trademark Office*

UNITED STATES PATENT AND TRADEMARK OFFICE
CERTIFICATE OF CORRECTION

PATENT NO. : 8,004,993 B2  
APPLICATION NO. : 12/507886  
DATED : August 23, 2011  
INVENTOR(S) : Angelow et al.

Page 1 of 1

It is certified that error appears in the above-identified patent and that said Letters Patent is hereby corrected as shown below:

Title page, item (12) "Angelow" should read -- Angelow et al. --.

Title page, Item (75) Inventor is corrected to read:
-- Harald Angelow, Vienna (AT);
Wilfried Steiner, Wien (AT); --.

This certificate supersedes the Certificate of Correction issued August 18, 2015.

Signed and Sealed this
Third Day of November, 2015

Michelle K. Lee
*Director of the United States Patent and Trademark Office*